(12) United States Patent
Moon et al.

(10) Patent No.: US 7,502,359 B2
(45) Date of Patent: *Mar. 10, 2009

(54) RADIO BASE STATION AND METHOD OF CONTROLLING RADIO COMMUNICATIONS

(75) Inventors: Sung Uk Moon, Yokosuka (JP); Toshiyuki Futakata, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 1277 days.

This patent is subject to a terminal disclaimer.

(21) Appl. No.: 10/235,707

(22) Filed: Sep. 6, 2002

(65) Prior Publication Data

US 2003/0043770 A1 Mar. 6, 2003

(30) Foreign Application Priority Data

Sep. 6, 2001 (JP) ............................. 2001-270870

(51) Int. Cl.
*H04B 7/212* (2006.01)
(52) U.S. Cl. .................. 370/348; 370/345; 370/347; 370/349; 455/67.16
(58) Field of Classification Search ............ 455/67.16; 370/345, 347–349
See application file for complete search history.

(56) References Cited

U.S. PATENT DOCUMENTS 5,991,282 A * 11/1999 Langlet et al. ............. 370/332
6,151,487 A * 11/2000 Kim et al. .................. 455/134
7,274,678 B2 * 9/2007 Hans et al. ................. 370/332

FOREIGN PATENT DOCUMENTS

| CN | 1304587 | 7/2001 |
|---|---|---|
| DE | 198 50 279 | 5/2000 |
| EP | 0 776 101 | 5/1997 |
| JP | 11-266228 | 9/1999 |
| JP | 11-275036 | 10/1999 |
| JP | 2001-148649 | 5/2001 |
| WO | WO 00/11806 | 3/2000 |
| WO | WO 0011806 A1 * | 3/2000 |
| WO | WO 01/28128 | 4/2001 |

OTHER PUBLICATIONS

U.S. Appl. No. 10/235,707, filed Sep. 6, 2002, pending.
U.S. Appl. No. 10/279,079, filed Oct. 24, 2002, pending.

* cited by examiner

*Primary Examiner*—Ricky Ngo
*Assistant Examiner*—Chandrahas Patel
(74) *Attorney, Agent, or Firm*—Oblon, Spivak, McClelland, Maier & Neustadt, P.C.

(57) ABSTRACT

The present invention provides a radio base station for preventing degradation of transmission quality characteristics even when there are time differences between the instant of channel estimation of uplink time slots UL#1 to UL#N and the instant of transmission of transmission data via downlink time slots DL#1 to DL#N. The radio base station includes transmit diversity controllers $14_1$ to $14_N$ for controlling transmit diversity to be used for downlink time slots DL#1 to DL#N and a data transmitter 15 for transmitting data via downlink time slots DL#1 to DL#N using the controlled transmit diversity.

4 Claims, 7 Drawing Sheets

| DL | UL | DL | UL | DL | UL | DL | DL | DL | UL | UL | UL | DL | DL | DL |
|----|----|----|----|----|----|----|----|----|----|----|----|----|----|----|
| #1 | #2 | #3 | #4 | #5 | #6 | #7 | #8 | #9 | #10 | #11 | #12 | #13 | #14 | #15 |

(b)

| DL | UL | DL | DL | DL | DL | DL | DL | DL | DL | DL | DL | DL | DL | DL |
|----|----|----|----|----|----|----|----|----|----|----|----|----|----|----|
| #1 | #2 | #3 | #4 | #5 | #6 | #7 | #8 | #9 | #10 | #11 | #12 | #13 | #14 | #15 |

DL : DOWNLINK
UK : UPLINK
N : TIME SLOT

RADIO BASE STATION AND METHOD OF CONTROLLING RADIO COMMUNICATIONS

CROSS REFERENCE TO RELATED APPLICATION

This application is based upon and claims the benefit of priority from the prior Japanese Patent Application No. P2001-270870, filed on Sep. 6, 2001; the entire contents of which are incorporated herein by reference.

BACKGROUND OF THE INVENTION

1. Field of the Invention

The present invention relates to a radio base station and a method of controlling radio communications. More particularly, the present invention relates to a radio base station and a method of controlling radio communications which use transmit diversity in TDMA or TDD systems.

2. Description of the Related Art

Fading typically occurs in radio communications, greatly degrading transmission quality, that is, bit error rate characteristics.

Transmit diversity is a known method for compensating such degradation of transmission quality due to fading. Downlink transmit diversity, a kind of transmit diversity, will be described.

Figure 1:
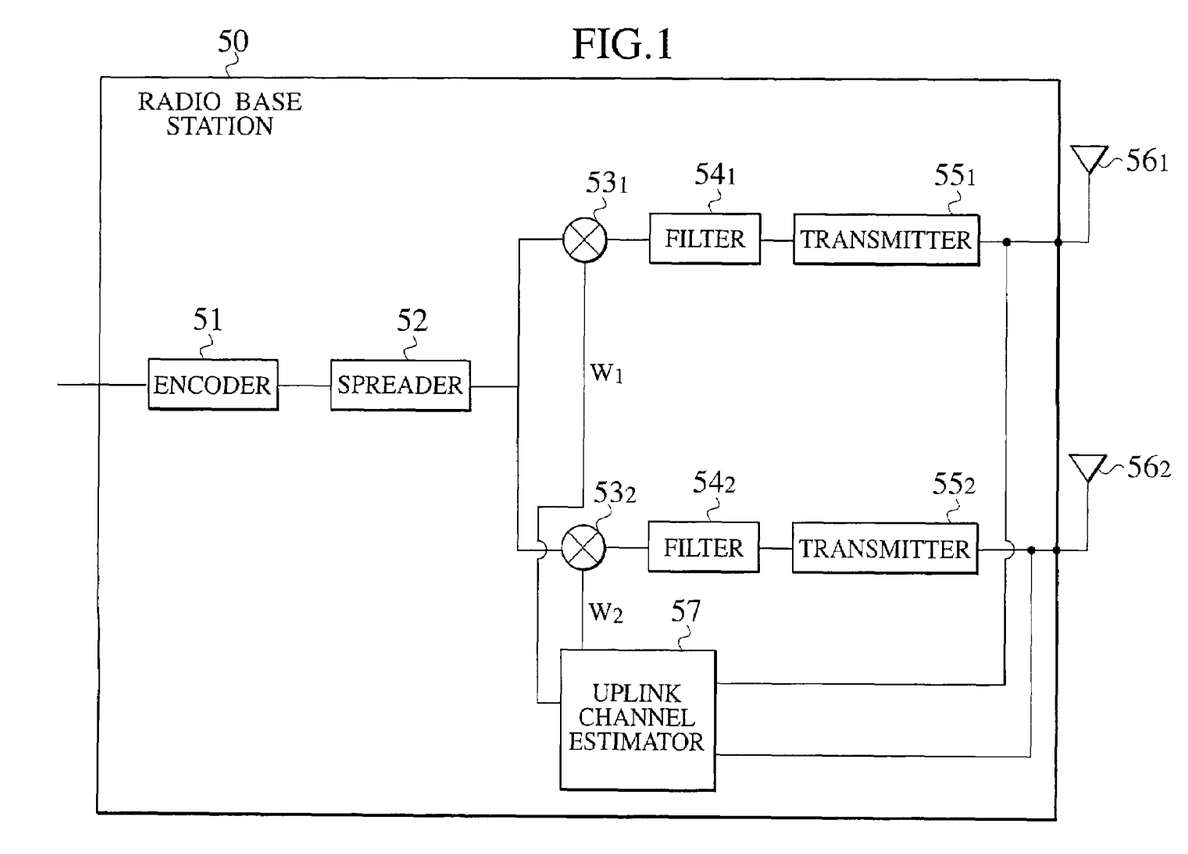
FIG. 1 is a schematic diagram of a radio base station according to a conventional art.

FIG. 1 partially illustrates the configuration of a radio base station 50 using a conventional downlink transmit diversity. The radio base station 50 includes, as shown in FIG. 1, an encoder 51, a spreader 52, weighting units $53_1$ and $53_2$, filters $54_1$ and $54_2$, transmitters $55_1$ and $55_2$, antennas $56_1$ and $56_2$, and an uplink channel estimator 57.

The encoder 51 is connected to the spreader 52, encoding and interleaving data to be transmitted (hereinafter referred to as transmission data) under a predetermined scheme and transmitting the encoded and interleaved transmission data to the spreader 52.

The spreader 52 is connected to the encoder 51 and the weighting units $53_1$ and $53_2$, spreading and scrambling transmission data received from the encoder 51 under a predetermined scheme and transmitting the spread and scrambled transmission data to the weighting units $53_1$ and $53_2$.

The weighting units $53_1$ and $53_2$ are connected to the spreader 52, the filters $54_1$ and $54_2$, and the uplink channel estimator 57, and weighting (e.g., multiplying) transmission data received from the spreader 52 by weighting factors W1 and W2 received from the uplink channel estimator 57. The weighting units $53_1$ and $53_2$ transmit the weighted transmission data to the filters $54_1$ and $54_2$.

The filters $54_1$ and $54_2$ are connected to the weighting units $53_1$ and $53_2$ and the transmitters $55_1$ and $55_2$, filtering transmission data received from the weighting units $53_1$ and $53_2$ and transmitting the filtered transmission data to the transmitters $55_1$ and $55_2$.

The transmitters $55_1$ and $55_2$ are connected to the filters $54_1$ and $54_2$ and the antennas $56_1$ and $56_2$, transmitting transmission data received from the filters $54_1$ and $54_2$ via radio lines with predetermined carrier frequencies, in cooperation with the antennas $56_1$ and $56_2$.

The uplink channel estimator 57 is connected to the weighting units $53_1$ and $53_2$ and the antennas $56_1$ and $56_2$, monitoring uplink radio communications channels (e.g., time slots, spread codes or carrier frequencies) set for the antennas $56_1$ and $56_2$, thereby estimating the status of the uplink radio communications channels (e.g., waveform distortion, delay fluctuation, amplitude fluctuation and phase lag) (performing channel estimation), determining the weighting factors W1 and W2 based on the channel estimation, and transmitting the determined weighting factors W1 and W2 to the weighting units $53_1$ and $53_2$.

STD (selective transmit diversity), a kind of downlink transmit diversity, for example, uses "1" or "0" as the weighting factor W1 and correspondingly "0" or "1" as the weighting factor W2. As a result, transmission data is transmitted only via either a first transmission line consisting of the filter $54_1$, transmitter $55_1$ and antenna $56_1$ or a second transmission line consisting of the filter $54_2$, transmitter $55_2$ and antenna $56_2$.

TxAA (Transmission Adaptive Array), a kind of downlink transmit diversity, can assign weighting factors to the antennas $56_1$ and $56_2$, respectively.

Figure 2:
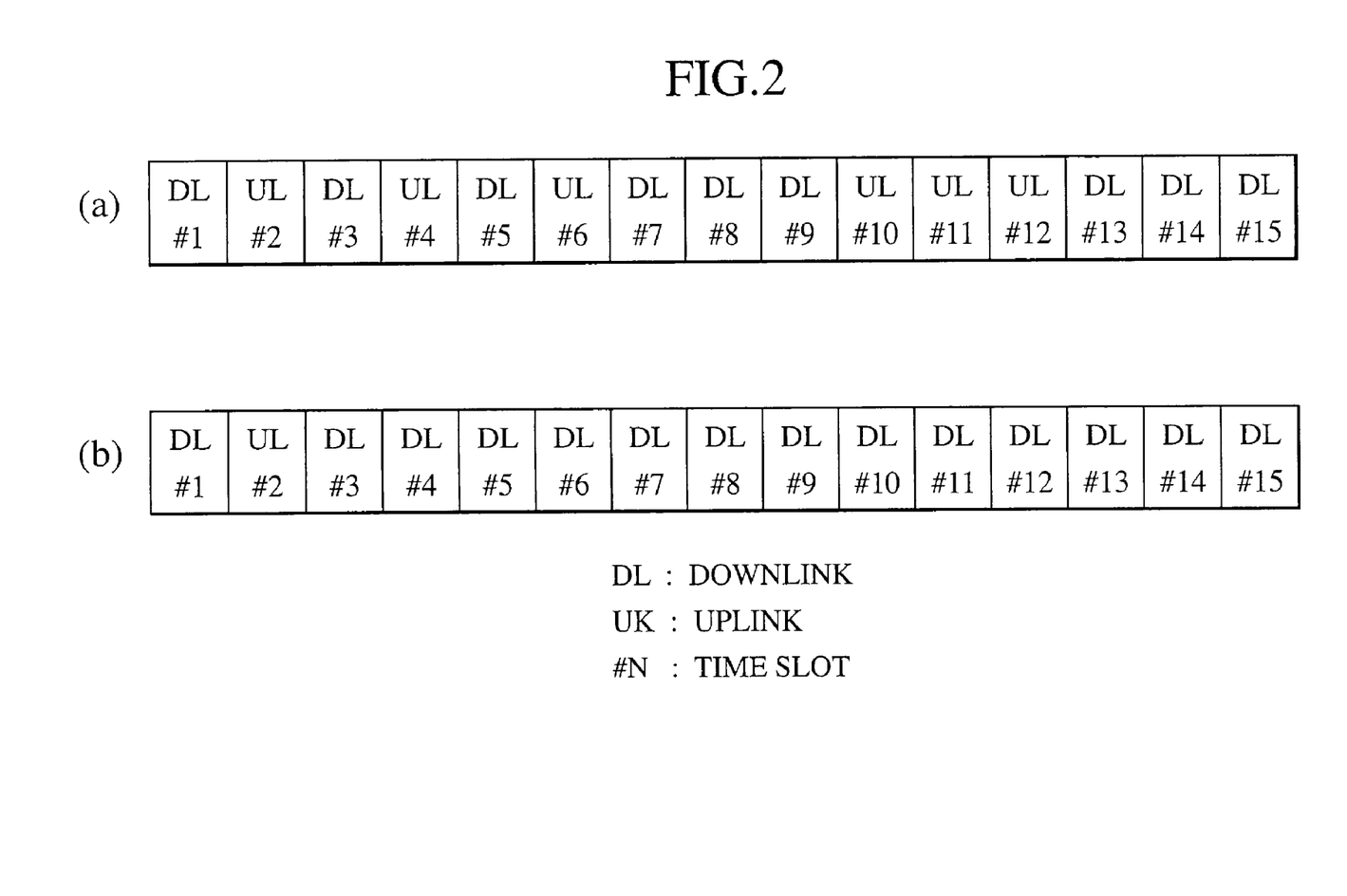
FIGS. 2(a) and 2(b) are diagrams illustrating time slot configurations used in the radio base station of the conventional art.

FIGS. 2(a) and 2(b) illustrate time slot configurations used on TDD radio communications channels.

When, for example, time slots shown in FIG. 2(a) are used, the uplink channel estimator 57 causes down link time slot #3 to reflect channel estimation of uplink time slot #2 and causes downlink time slot #5 to reflect channel estimation of uplink time slot #4, thus controlling downlink transmit diversity based on the channel estimation of immediately preceding uplink time slots.

When time slots shown in FIG. 2(b) are used, for example, the uplink channel estimator 57 controls downlink transmit diversity so that channel estimation of uplink time slot #2 is reflected by all of the subsequent time slots (#3 to #15).

In a radio base station and a method of controlling radio communications using the conventional downlink transmit diversity, there are time differences between the instant of channel estimation of uplink time slots and the instant of transmission of transmission data via downlink time slots. Directly using the channel estimation of uplink time slots at the time of transmitting transmission data via downlink time slots may result in estimation errors.

In particular, as in the case of FIG. 2(b), the greater the time difference between the instant of channel estimation of an uplink time slot and the instant of transmission of transmission data via a downlink time slot, the greater an estimation error.

Figure 3:
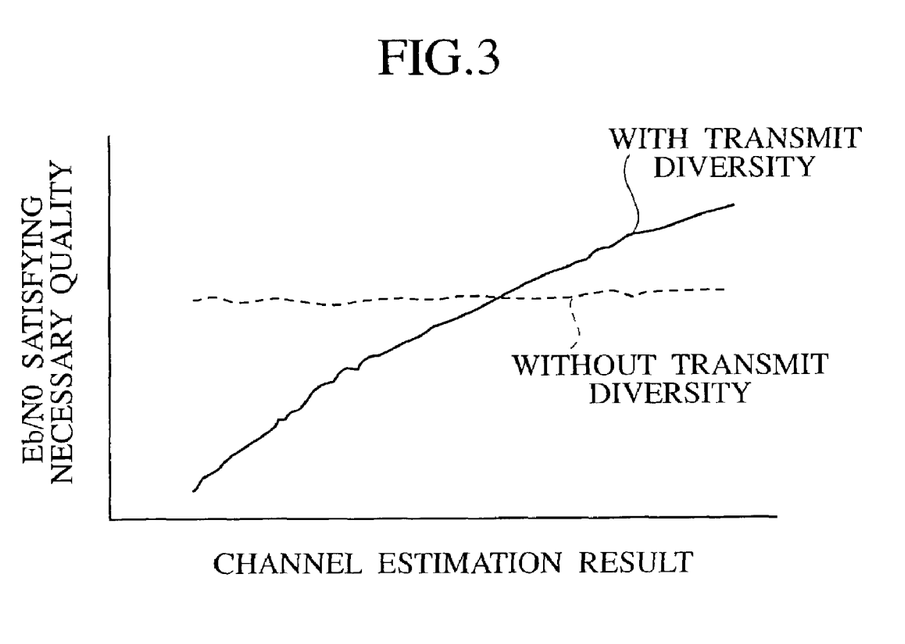
FIG. 3 is a graph illustrating the relationship between channel estimation results and transmission quality characteristics in the radio base station of the conventional art.

Thus when the time difference is great, a method of controlling radio communications and a radio base station using the conventional downlink transmit diversity may degrade the transmission quality characteristics more than without using the downlink transmit diversity, as shown in FIG. 3.

In an art of reducing the size of receivers on the assumption that channel estimation results of different users are the same, such as "SUD (single user detection)", the use of transmit diversity causes different results of channel estimation of different users, thus degrading transmission quality characteristics.

BRIEF SUMMARY OF THE INVENTION

An object of the present invention is to provide a radio base station and a method of controlling radio communications which prevent degradation of transmission quality characteristics even when there are time differences between the instant of channel estimation of uplink time slots and the instant of transmission of transmission data via downlink time slots.

According to a first aspect of the present invention, there is provided a radio base station which comprises: a transmit diversity controller configured to control transmit diversity to be used for each downlink time slot; and a data transmitter configured to transmit data via the downlink time slot using the controlled transmit diversity.

The radio base station preferably further comprises a channel estimator configured to perform channel estimation of uplink time slots. The transmit diversity controller preferably controls the transmit diversity based on the channel estimation.

The transmit diversity controller preferably controls transmit diversity to be used for each downlink time slot based on the time difference from the instant of the channel estimation.

The transmit diversity controller preferably determines whether or not to use transmit diversity for each downlink time slot, based on the channel estimation.

The transmit diversity controller preferably determines a kind of transmit diversity to be used for each downlink time slot, based on the channel estimation.

According to a second aspect of the present invention, there is provided a method of controlling radio communications, which comprises the steps of: a) controlling, at a radio base station, transmit diversity to be used for each downlink time slot; and b) transmitting, at the radio base station, data in the downlink time slot using the controlled transmit diversity.

The method preferably further comprises the step of c) performing channel estimation of uplink time slots. In step a), the transmit diversity is preferably controlled based on the channel estimation.

In the step a), the transmit diversity is preferably controlled for each downlink time slot, based on the time difference from the instant of the channel estimation.

In the step a), it is preferably determined whether or not to use transmit diversity for each downlink time slot, based on the channel estimation.

In the step a), a kind of transmit diversity to be used is preferably determined for each downlink time slot, based on the channel estimation.

DETAILED DESCRIPTION OF THE INVENTION

Figure 4:
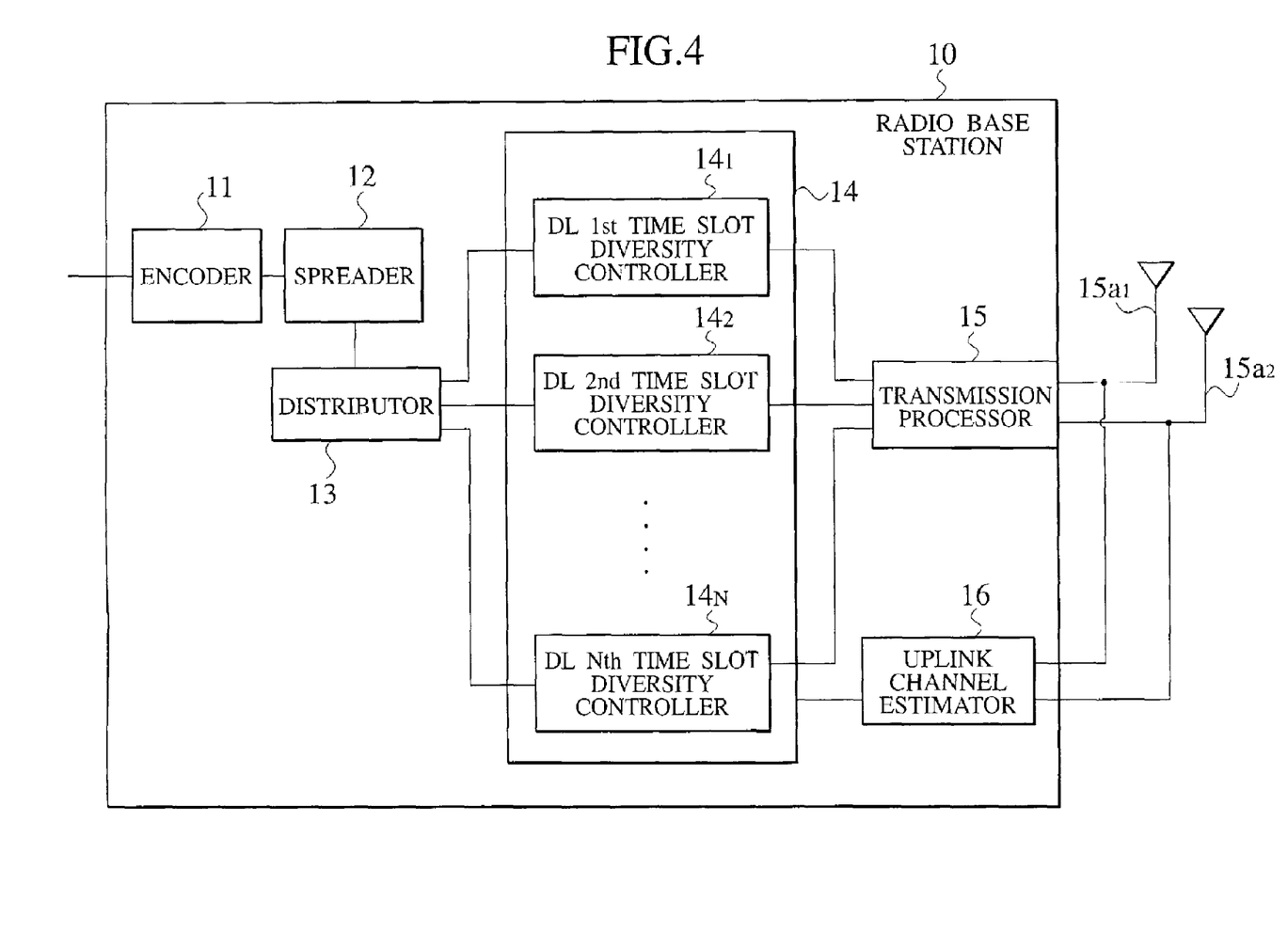
FIG. 4 is a schematic diagram of a radio base station according to an embodiment of the present invention.

Configuration of Radio Base Station According to Embodiment of the Present Invention The configuration of a radio base station according to an embodiment of the present invention will be described with reference to the accompanying drawings. FIG. 4 is a diagram illustrating the general configuration of a radio base station 10 according to this embodiment.

The radio base station 10 of this embodiment transmits transmission data to radio information terminals via radio communications channels. The radio base station 10 includes, as shown in FIG. 4, an encoder 11, a spreader 12, a distributor 13, a downlink (DL) time slot diversity controller 14, a transmission processor 15, and an uplink channel estimator 16.

The encoder 11 and the spreader 12 have the same functions as those of the encoder 51 and the spreader 52 of the conventional radio base station 50. The encoder 11 is connected to the spreader 12. The spreader 12 is connected to the encoder 11 and the distributor 13.

The distributor 13 is connected to the spreader 12 and the downlink time slot diversity controller 14, dividing transmission data received from the spreader 12 into downlink (DL) time slots (DL#1 to DL#N) and transmitting the respective divided transmission data of the time slots (DL#1 to DL#N) to corresponding downlink (DL) first to Nth time slot diversity controllers $14_1$ to $14_N$.

The downlink time slot diversity controller 14 is connected to the distributor 13, the transmission processor 15 and the uplink channel estimator 16, including the downlink first to Nth time slot diversity controllers $14_1$ to $14_N$ corresponding to the downlink time slots (DL#1 to DL#N).

The downlink first to Nth time slot diversity controllers $14_1$ to $14_N$ determine whether or not to use transmit diversity or determine which transmit diversity to use (a kind of transmit diversity) for the corresponding downlink time slots (DL#1 to DL#N), based on the channel estimation of uplink channels performed by the uplink channel estimator 16, thereby performing diversity control. The transmit diversity to be used here includes, for example, downlink transmit diversity (such as STD and TXAA).

In short, the downlink first to Nth time slot diversity controllers $14_1$ to $14_N$ constitute a transmit diversity controller for controlling transmit diversity to be used for each of the downlink time slots DL#1 to DL#N.

When the time slots shown in FIG. 2B are used, for example, the downlink third and fourth time slot diversity controllers $14_3$ and $14_4$ may determine the use of transmit diversity for DL#3 and DL#4, and the downlink fifth to fifteenth time slot diversity controllers $14_5$ to $14_{15}$ may determine nonuse of transmit diversity for DL#5 to DL#15.

Alternatively, when the time slots shown in FIG. 2B are used, for example, the downlink third to fifth time slot diversity controllers $14_3$ to $14_5$ may determine the use of TxAA for DL#3 to DL#5, and the downlink sixth to fifteenth time slot diversity controllers $14_6$ to $14_{15}$ may determine the use of STD for DL#6 to DL#15.

The transmission processor 15 is connected to the downlink time slot diversity controller 14 and the uplink channel estimator 16, processing transmission data received from the downlink time slot diversity controller 14 in accordance with the corresponding transmit diversity (e.g., selecting a transmission line or weighting each transmission line), performing filtering as required, and transmitting the processed transmission data via antennas $15_{a1}$ and/or $15_{a2}$.

In short, the transmission processor 15 constitutes a data transmitter for transmitting data with the downlink time slots DL#1 to DL#N, using controlled transmit diversity.

The uplink channel estimator 16 is connected to the downlink time slot diversity controller 14 and the antenna $15_{a1}$ and $15_{a2}$, monitoring uplink radio communications channels set for the antenna $15_{a1}$ and $15_{a2}$, estimating the status of the uplink radio communications channels (such as waveform distortion, delay fluctuation, amplitude fluctuation, and phase log) (performing channel estimation), and transmitting the channel estimation to the downlink time slot diversity controller 14.

In short, the uplink channel estimator 16 constitutes a channel estimator for performing channel estimation of uplink time slots UL#1 to UL#N.

Operation of Radio Base Station of this Embodiment

Figure 5:
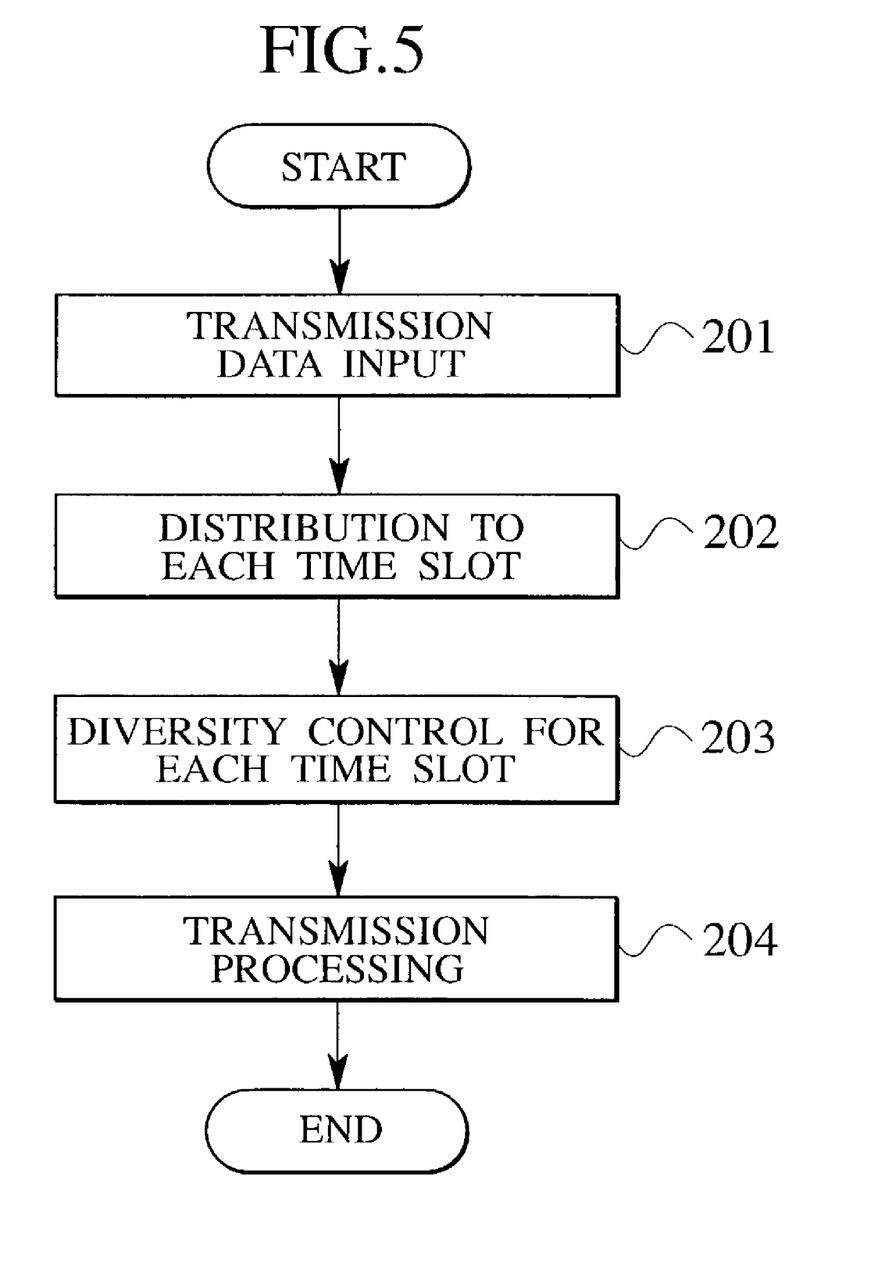
FIG. 5 is a flowchart illustrating the sequence of operations of the radio base station of the embodiment to transmit transmission data received, via a radio communications channel.

The operation of the radio base station 10 with the above configuration will be described with reference to FIG. 5. FIG. 5 is a flowchart illustrating the operation of the radio base station 10 for transmitting received transmission data via radio communications channels.

At step 201 shown in FIG. 5, transmission data to be transmitted via radio communications channels is supplied to the encoder 11. The encoder 11 encodes and interleaves the supplied transmission data and transmits the transmission data to the spreader 12. The spreader 12 spreads and scrambles the transmission data and transmits the transmission data to the distributor 13.

At step 202, the distributor 13 divides the transmission data received from the spreader 12 into down link time slots (DL#1 to DL#N) and transmits the respective divided transmission data of the time slots (DL#1 to DL#N) to the corresponding downlink first to Nth time slot diversity controllers $14_1$ to $14_N$.

At step 203, the downlink first to Nth time slot diversity controllers $14_1$ and $14_N$ determine whether or not to use transmit diversity for the corresponding downlink time slots (DL#1 to DL#N) or determine which transmit diversity to use, based on the channel estimation of the uplink channels performed by the uplink channel estimator 16, thereby performing diversity control.

At step 204, the transmission processor 15 processes the transmission data received from the downlink time slot diversity controller 14 in accordance with the corresponding transmit diversity (e.g., selects a transmission line or weights each transmission line), performs filtering as required, and transmits the processed transmission data via the antennas $15_{a1}$ and $15_{a2}$.

Function/Effect of Radio Base Station of this Embodiment

The radio base station 10 according to this embodiment has the downlink first to Nth time slot diversity controllers $14_1$ and $14_2$ which control transmit diversity to be used for the respective downlink time slots (DL#1 to DL#N), thus preventing degradation of downlink transmission quality characteristics even when there is a time difference between the instant of the channel estimation of an uplink time slot (UL#2) and the instant of transmission of transmission data via a downlink time slot (UL#15).

Configuration of Radio Base Station According to Modification 1

Figure 6:
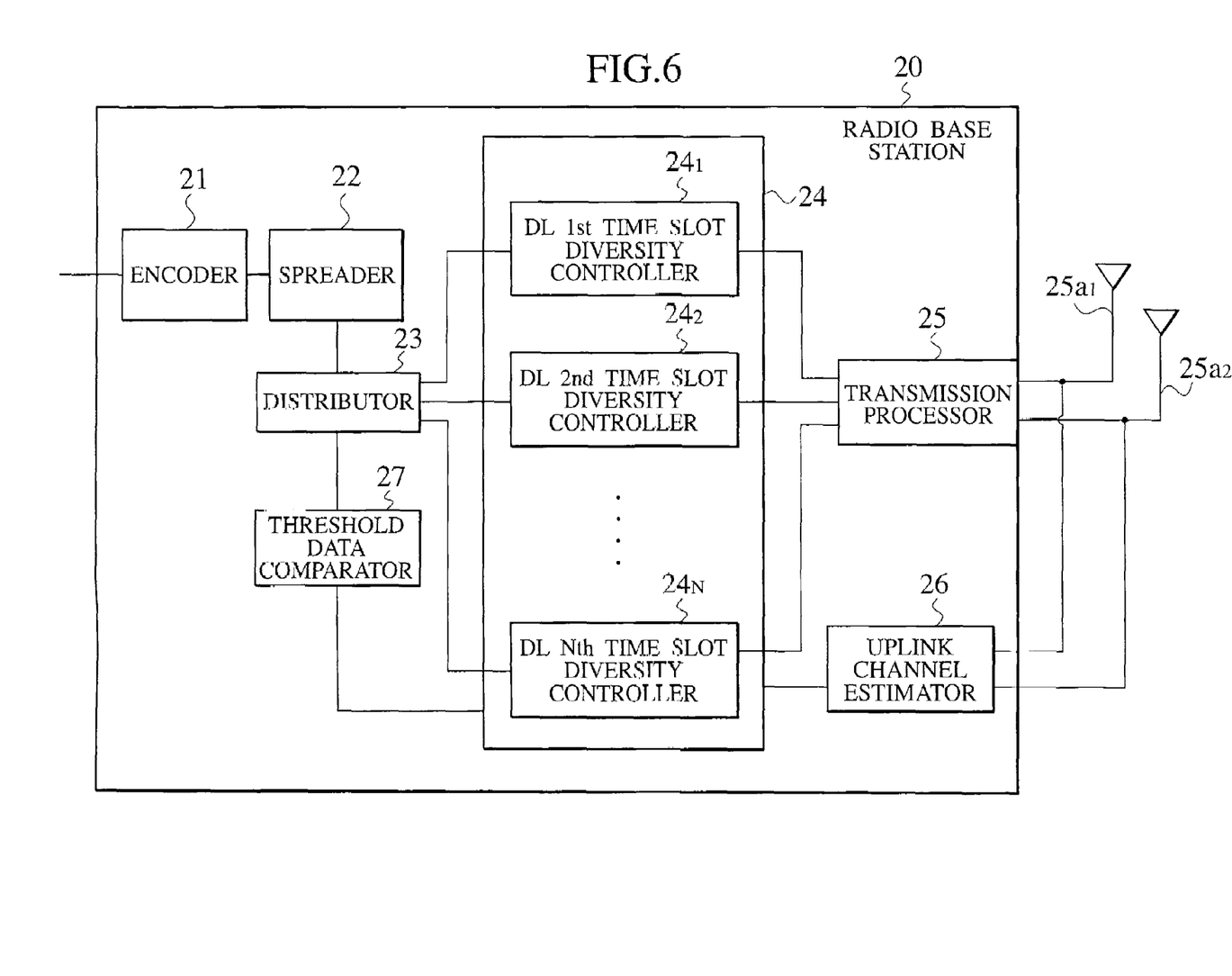
FIG. 6 is a schematic diagram of a radio base station according to a modification of the embodiment of the present invention.

The present invention is not limited to the above embodiment, and may have a threshold data comparator provided between a distributor 23 and a downlink time slot diversity controller 24 as shown in FIG. 6.

The threshold data comparator 27 measures time differences between downlink time slots (DL#1 to DL#N) with data divided by the distributor 23 therefor and a time slot on which channel estimation is performed, and compares the time differences found by the measurements with a time difference as predetermined threshold data. The threshold data comparator 27 transmits the comparison results to corresponding downlink first to Nth time slot diversity controllers $24_1$ to $24_N$.

The downlink first to Nth time slot diversity controllers $24_1$ to $24_N$ determine whether or not to use transmit diversity for the corresponding downlink time slots (DL#1 to DL#N) or determine which transmit diversity to use, based on the channel estimation of the uplink channels by an uplink channel estimator 26 and the comparison results received from the threshold data comparator 27, thereby performing diversity control. Transmit diversity to be used here includes downlink transmit diversity (such as STD and TxAA), for example.

In short, the downlink first to Nth time slot diversity controllers $24_1$ to $24_N$ constitute a transmit diversity controller for controlling transmit diversity to be used for each of the downlink time slots DL#1 to DL#N.

When the time slots shown in FIG. 2B are used, for example, the downlink third to sixth time slot diversity controllers $24_3$ to $24_6$ may determine use of transmit diversity for DL#3 to DL#6 which are time slots not exceeding a time difference as predetermined threshold data (e.g., four time slots), and the seventh to fifteenth time slot diversity controllers $24_7$ to $24_{15}$ may determine nonuse of transmit diversity for DL#7 to DL#15 which are time slots exceeding the time difference as the predetermined threshold data (e.g., four time slots).

Alternatively, when the time slots shown in FIG. 2B are used, for example, the downlink third to sixth time slot diversity controllers $24_3$ to $24_6$ may determine use of TxAA for DL#3 to DL#6 which are time slots not exceeding a time difference as predetermined threshold data (e.g., four time slots), and the seventh to fifteenth time slot diversity controllers $24_7$ to $24_{15}$ may determine use of STD for DL#7 to DL#15 which are time slots exceeding the time difference as the predetermined threshold data (e.g., four time slots).

Operation of Radio Base Station of this Modification

Figure 7:
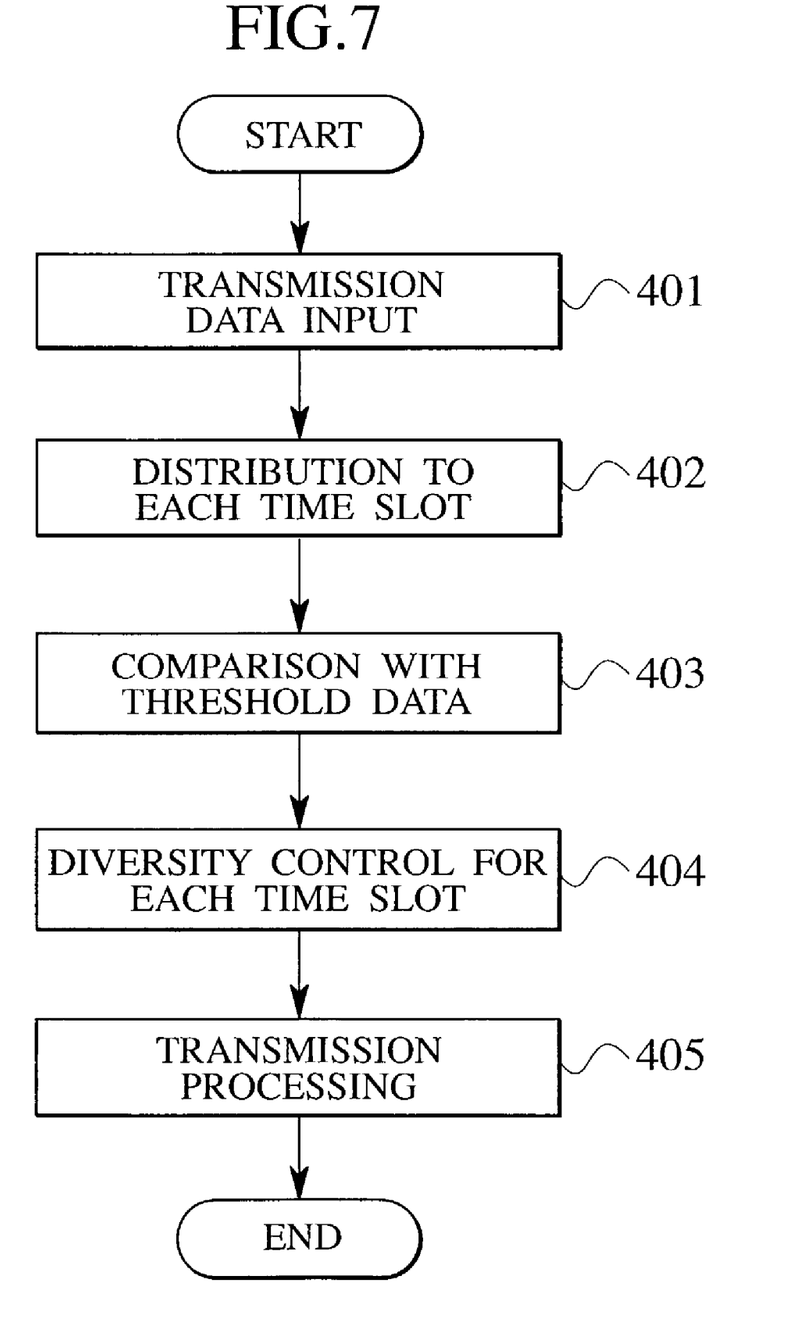
FIG. 7 is a flowchart illustrating the sequence of operations of the radio base station of the modification of the present invention to transmit transmission data received, via a radio communication channel.

The operation of a radio base station 20 with the above configuration will be described with reference to FIG. 7. FIG. 7 is a flowchart illustrating the operation of the radio base station 20 for transmitting received transmission data via radio communications channels.

At step 401 shown in FIG. 7, transmission data to be transmitted via radio communications channels is supplied to an encoder 21. The encoder 21 encodes and interleaves the supplied transmission data and transmits the transmission data to a spreader 22. The spreader 22 spreads and scrambles the transmission data and transmits the transmission data to the distributor 23.

At step 402, the distributor 23 divides the transmission data received from the spreader 12 into the downlink time slots (DL#1 to DL#N) and transmits the respective divided transmission data of the time slots (DL#1 to DL#N) to the corresponding downlink first to Nth time slot diversity controllers $24_1$ to $24_N$.

At step 403, the threshold data comparator 27 measures time differences between the downlink time slots (DL#1 to DL#N) with the data divided by the distributor 23 therefor and a time slot on which channel estimation is performed, and compares the time differences found by the measurements and a time difference as predetermined threshold data. The threshold data comparator 27 transmits the comparison results to the corresponding downlink first to Nth time slot diversity controllers $24_1$ to $24_N$.

At step 404, the downlink first to Nth time slot diversity controllers $24_1$ to $24_N$ determine whether or not to use transmit diversity or determines which transmit diversity to use for the corresponding downlink time slots (DL#1 to DL#N), based on the channel estimation of uplink channels performed by the uplink channel estimator 26 and the comparison results received from the threshold data comparator 27, thereby performing diversity control.

At step 405, a transmission processor 25 processes the transmission data received from the downlink time slot diversity controller 24 in accordance with the corresponding transmit diversity (e.g., selects a transmission line or weights each transmission line), performs filtering as required, and transmits the processed transmission data via antennas $25_{a1}$ and $25_{a2}$.

Modification 2

The present invention may be applied not only to TDMA and TDD systems (that is, systems using time slots as radio communications channels) as in the above embodiment and modification 1, but also to CDMA-TDD systems (that is, systems using spread codes as radio communications channels).

As described above, the present invention can provide a radio base station and a method of controlling radio communications which prevent degradation of transmission quality characteristics even when there are time differences between the instant of channel estimation of uplink time slots and the instant of transmission of transmission data via downlink time slots.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A radio base station comprising:
   a channel estimator configured to perform a channel estimation of an uplink time slot;
   a transmit diversity controller configured to control transmit diversity used for each downlink time slot, based on a result of the channel estimation and a time difference between an instant of the channel estimation and an instant of a transmission of data via the the downlink time slot, wherein the transmit diversity controller determines to apply transmit diversity when the time difference between an instant of the channel estimation and an instant of a transmission of data via each downlink time slot is below a predetermined threshold, and determines to not apply transmit diversity when the time difference between an instant of the channel estimation and an instant of a transmission of data via each downlink time slot exceeds a predetermined threshold; and
   a data transmitter configured to transmit the data in the downlink time slot using the controlled transmit diversity.

2. A radio base station as set forth in claim 1, wherein:
   the transmit diversity controller determines a kind of transmit diversity to be used for each downlink time slot, based on the result of channel estimation and the time difference.

3. A method of controlling radio communications, comprising:
   performing, at a radio base station, a channel estimation of an uplink time slot;
   controlling, at the radio base station, transmit diversity used for each downlink time slot, based on a result of the channel estimation and a time difference between an instant of the channel estimation and an instant of a transmission of data via the downlink time slot, wherein transmit diversity is applied when the time difference between an instant of the channel estimation and an instant of a transmission of data via each downlink time slot is below a predetermined threshold, and transmit diversity is not applied when the time difference between an instant of the channel estimation and an instant of a transmission of data via each downlink time slot exceeds a predetermined threshold; and
   transmitting, at the radio base station, the data in the downlink time slot using the controlled transmit diversity.

4. A method of controlling radio communications as set forth in claim 3, wherein:
   said controlling comprises determining a kind of transmit diversity to be used for each downlink time slot, based on the result of the channel estimation and the time difference.

* * * * *